July 9, 1940.   S. W. ALDERFER   2,207,279
CORD FABRIC AND METHOD OF MAKING THE SAME
Filed Dec. 7, 1937
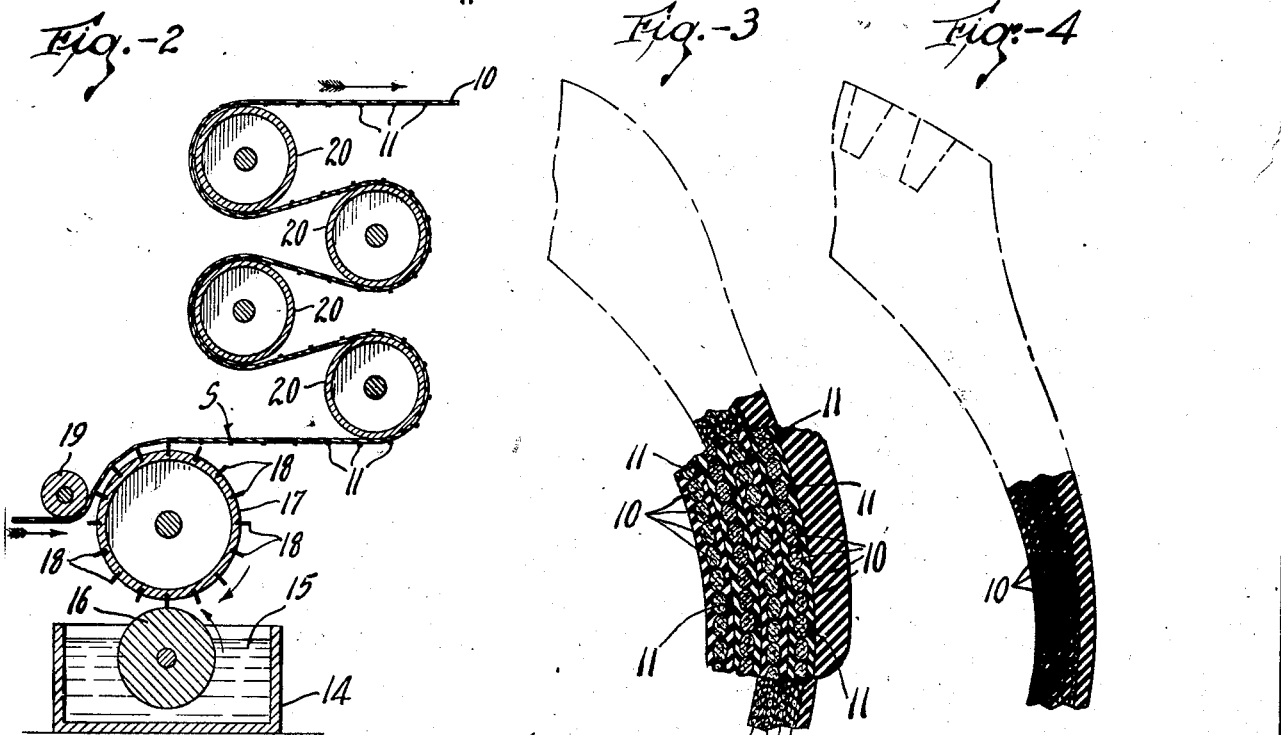
INVENTOR
STERLING W. ALDERFER
BY Albert L. Ely
ATTORNEY

UNITED STATES PATENT OFFICE 2,207,279

CORD FABRIC AND METHOD OF MAKING THE SAME

Sterling W. Alderfer, Fairlawn, Ohio, assignor to The Firestone Tire & Rubber Company, Akron, Ohio, a corporation of Ohio Application December 7, 1937, Serial No. 178,511

6 Claims. (Cl. 154—2)

This invention relates to cord fabric such as commonly is used in the manufacture of pneumatic tire casings, and to methods of manufacturing the same, and more especially it relates to the art of producing weftless cord fabric.

Weftless cord fabric, sometimes called "creel" fabric, is superior to square woven fabric or weak-wefted cord fabric for use in the carcass of pneumatic tire casings, for the reason that there are no weft strands to cut the warp strands or to force them into non-parallel relationship. The absence of weft strands, either heavy cords or widely spaced, weak, pick strands, makes it necessary to assemble weftless cord fabric at a calender where a coating of rubber is applied to one side of a continuous length of the fabric as a means for holding strands in proper relation to each other. The initial cost of creels and other equipment necessary for producing weftless cord fabric in the manner described is so great as to be prohibitive to other than large manufacturers of cord tires engaged in mass production, whereby the equipment may be continuously employed.

The chief objects of this invention are to produce an improved weftless cord fabric; to provide a weftless cord fabric that may conveniently be made up by cotton manufacturer, and thereafter handled and processed in the same manner as ordinary woven fabric; and to provide a method of manufacturing fabric of the character mentioned. Other objects will be manifest as the specification proceeds.

Of the accompanying drawing:

Figure 1 is a plan view, on a large scale, of a fragmentary part of a strip of cord fabric embodying the invention;

Figure 2 is somewhat diagrammatic sectional view of apparatus for producing the cord fabric shown in Figure 1;

Figure 3 is a fragmentary sectional view of a pneumatic tire casing with the improved cord fabric therein, in unvulcanized condition;

Figure 4 is a view of the structure shown in Figure 4 after it has been vulcanized; and Figures 5, 6 and 7 are plan views similar to Figure 1 showing other embodiments of the invention.

Briefly stated, the improved cord fabric contemplated by this invention consists of continuous warp strands arranged side by side and adhesively bonded to adjacent strands, at spaced regions longitudinally of the fabric. As shown in Figure 1, the warp strands are designated 10, 10 and the bonds between strands are designated 11, 11. Said bonds 11 are composed of a plastic or viscous material that will strongly adhere to the cord strands, and will have sufficient body to extend from strand to strand without breaking. Furthermore, the bond must be of a composition that will coalesce or cure into the rubber coating that is subsequently applied to the fabric, so that in the vulcanized article said coating will be perfectly bonded to the cords. To this end the bonding material conveniently may be of rubber composition, preferably a natural or artificial aqueous dispersion of rubber, such as rubber latex, although masticated rubber dissolved in a volatile solvent may be employed if desired. As shown in Figure 1, the bonds 11 extend from one lateral margin of the fabric strip to the other, the strip as a unit being designated S.

Apparatus for the manufacture of the fabric strip S is shown in Figure 2 wherein 14 designates a receptacle or tank, 15 is a quantity of viscous material therein of the same composition as the bonds 11, 16 is a transfer roller that is partly submerged in the viscous material 15 and has an exposed portion above the level of said material, and 17 is a distributing roller that has its peripheral face provided with a circumferential series of axially extending, parallel ribs 18, 18. The roller 17 is rotated at the same surface speed as the transfer roller 16, in the direction indicated by the arrows, the roller 17 being so positioned that the outer margins of the ribs 18 thereon will make peripheral contact with the transfer roller 16 so as to pick up viscous material therefrom. A guide roller 19 is mounted adjacent distributing roller 17 for guiding a group of parallel cord strands 10 onto the latter where they pick up the viscous material from the ribs 18, which material constitutes the spaced bonds 11, 11 that unite the strands 10 to produce the fabric strip S. A plurality of heated rolls 20, 20 are provided for drying the viscous deposit upon the strands 10, said strands passing to the drying rolls after being in contact with the distributor roller 17 throughout part of a revolution of the latter to the end that the viscous material may obtain tenacious adhesion to the strands and be entirely removed from the margins of the distributor ribs 18. The drying rolls 20 may be arranged in staggered relation as shown, and the strip S may be trained thereabout so that first one face of the strip and then its other face makes contact with a heated roll. The drying rolls serve to dry the viscous deposits upon the fabric, the dry deposits being non-tacky so that the finished product may be rolled up without the use of liner between convolutions to prevent them from sticking together.

The finished fabric strip S as described may be made up in the cotton mill that produces the cotton cord strands 10. The fabric thereafter may be handled with the same facility and in the same manner as ordinary weak-wefted cord fabric or square-woven fabric. In the rubber industry the fabric may be impregnated with rubber composition and then coated with unvulcanized rubber in a calender as is well known in the art. It is then bias-cut into smaller pieces of proper length and width and built into the carcasses of pneumatic tire casings. A fragmentary section of such a tire casing, in unvulcanized condition, is shown in Figure 3 wherein the bonds 11 are still identifiable. In Figure 4 the same tire section is shown after vulcanization has been effected, the bonds 11 not being in evidence for the reason that they have coalesced with the rubber coating upon the fabric.

Tires made with the improved cord fabric have a perfect bond between the rubber and the cord strands whereby the possibility of ply separation is reduced to a minimum. The improved weftless fabric preferably is manufactured at the cotton mill, and supplied to the tire manufacturers according to the latter's specifications. Thus the tire manufacturer is able to obtain weftless fabric having all the advantageous characteristics of creel fabric without the labor and the expense of equipment necessary for the production of creel fabric. Drying of the viscous bonds 11 increases their tensile strength and renders them non-sticky.

In Figure 1 the bonding elements 11 are shown as narrow zones of bonding material extending transversely of the strip S from one margin thereof to the other, at spaced intervals longitudinally of the strip. In the embodiment of the invention shown in Figure 5 the cord bonds consist of relatively short lengths 22, 22 of bonding material disposed transversely of the strip, each bond extending across several cords and being spaced from the adjacent bonds in longitudinal alignment therewith, the bonds of each transverse row being staggered with relation to the bonds of each adjacent row.

In the embodiment of the invention shown in Figure 6 the bonds, designated 24, are arranged similar to Figure 5, but are of different shape than in the latter figure, being elliptical in contour, and of such width as to overlie at least three cord strands.

In the embodiment shown in Figure 7, the bonds are in the form of circles 26, 26 that are spaced apart from each other and arranged in successive rows that extend from one side of the strip S to the other, the circles of each row being in staggered relation to those of adjacent rows.

Although the bonds of the respective embodiments of the invention are shown applied to one side only of the strips, the invention is not limited to this arrangement and bonds may be applied to both sides of the strips if desired.

Other modification may be resorted to without departing from the spirit of the invention, or the scope thereof as defined by the appended claims.

What is claimed is:

1. Weftless fabric consisting of warp strands restrained against separation from each other solely by bonds applied to spaced portions of one surface of the fabric, the bonds being of a material that will coalesce with unvulcanized rubber in the presence of heat.

2. Weftless fabric consisting of warp strands held together solely by spaced bonds of rubber composition on one surface of the warp strands.

3. Weftless fabric consisting of warp strands held together solely by rubber deposited from latex in the form of spaced, transverse strips.

4. The method of making weftless fabric which comprises arranging the warp strands thereof in parallelism, to form a strip, applying a rubber dispersion locally to the surface of the strip, at spaced apart but transversely overlapping regions thereof, and then drying the bonds to render them non-tacky and to increase their tensile strength.

5. The method of making weftless fabric which comprises feeding a group of parallel warp strands longitudinally, and progressively applying a rubber dispersion locally to the group of strands in the form of spaced, transverse strips, to hold them together, as they are so fed.

6. The method of making weftless fabric which comprises arranging a plurality of warp cords in parallelism in a given plane to form a layer one cord in thickness, applying a rubber-like viscous bonding material to spaced portions of said layer, the bonding material being positioned in staggered but transversely overlapping portions of said layer, and drying the bonding material to unite said layer of cords into a weftless fabric.

STERLING W. ALDERFER.

CERTIFICATE OF CORRECTION.

Patent No. 2,207,279.                                          July 9, 1940.

STERLING W. ALDERFER.

It is hereby certified that error appears in the printed specification of the above numbered patent requiring correction as follows: Page 2, second column, line 47, claim 6, for the word "lever" read --layer--; and that the said Letters Patent should be read with this correction therein that the same may conform to the record of the case in the Patent Office.

Signed and sealed this 27th day of August, A. D. 1940.

(Seal)                                        Henry Van Arsdale,
                                              Acting Commissioner of Patents.